(12) United States Patent
Tohyama et al.

(10) Patent No.: US 7,627,943 B2
(45) Date of Patent: Dec. 8, 2009

(54) METHOD OF MANUFACTURING A PRESSURE SENSOR

(75) Inventors: Shuji Tohyama, Tokyo (JP); Takayuki Yokoyama, Tokyo (JP); Ikuya Miyahara, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 11/566,279

(22) Filed: Dec. 4, 2006

(65) Prior Publication Data

US 2007/0089523 A1 Apr. 26, 2007

Related U.S. Application Data

(62) Division of application No. 11/091,321, filed on Mar. 28, 2005, now Pat. No. 7,165,459.

(30) Foreign Application Priority Data

Mar. 29, 2004 (JP) .............................. 2004-096050

(51) Int. Cl.
*H01C 17/28* (2006.01)
(52) U.S. Cl. .......................... 29/621.1; 73/715; 73/721; 257/417; 257/418; 257/419; 257/420; 29/407.07; 29/511; 29/516
(58) Field of Classification Search ................ 29/621.1, 29/407.07, 511, 516, 595; 73/715, 721; 257/417–420
See application file for complete search history.

(56) References Cited

U.S. PATENT DOCUMENTS

| | | | |
|---|---|---|---|
| 3,899,766 A | 8/1975 | Melmelstein |
| 5,535,629 A | 7/1996 | Gerdes et al. |
| 5,587,601 A | 12/1996 | Kurtz |
| 5,939,637 A | 8/1999 | Pitzer et al. |

FOREIGN PATENT DOCUMENTS

| | | |
|---|---|---|
| EP | 1336830 | 8/2003 |
| JP | 63-228038 | 9/1988 |
| JP | 3-93756 | 9/1991 |
| JP | 5-34550 | 5/1993 |
| JP | 6-37739 | 5/1994 |
| JP | 11-173930 | 7/1999 |
| JP | 2002-542107 | 12/2002 |
| WO | 00/63665 | 10/2000 |

*Primary Examiner*—Thiem Phan
(74) *Attorney, Agent, or Firm*—Rankin, Hill & Clark LLP

(57) ABSTRACT

A method of manufacturing a pressure sensor is provided whereby the pressure sensor includes a joint, a diaphragm, and an adapter disposed between the joint and the diaphragm. The adapter includes an axis portion and a flange projecting in a radial direction from the axis portion. The axis portion is disposed such that one end does not interfere with the joint and the other end is welded to the diaphragm. The diaphragm is welded to the adapter and the welded portion the welded portion is positioned on an inner side of an end face of the joint. The joint is caulked to a peripheral edge of the flange of the adapter.

1 Claim, 4 Drawing Sheets

METHOD OF MANUFACTURING A PRESSURE SENSOR

CROSS REFERENCE TO RELATED DOCUMENTS

This application is a Division of U.S. application Ser. No. 11/091,321, filed on Mar. 28, 2005, now U.S. Pat. No. 7,165,459, which claims the benefit of JAPAN Application No. 2004-096050, filed on Mar. 29, 2005.

BACKGROUND OF THE INVENTION

1. Field of the Invention

The present invention relates to a pressure sensor provided with a joint and a diaphragm, and a manufacturing method of the same.

2. Description of Related Art

Various types of pressure sensors have been conventionally used in order to detect fluid pressure. Among pressure sensors, there is known such a pressure sensor that converts fluid pressure into strain through a diaphragm, and then takes out signals of the strain as changes of electrical resistance by means of a strain gauge on the diaphragm.

Downsizing, light weight, and low cost are demanded for the pressure sensors in the fields where high accuracy and high environmental resistance are required such as in vehicle applications and construction machinery applications.

A conventional pressure sensor is provided with a joint mounted on a pipe in which fluid to be measured flows and a diaphragm welded to the joint (for example, refer to Reference: Japanese Patent Laid-Open Publication No. 11-173930, FIG. 1, and FIG. 2).

FIG. 5 shows a schematic view of the conventional example.

Referring to FIG. 5, the pressure sensor is provided with a joint 101 made of stainless steel and a diaphragm 102 made of stainless steel, and a pressure guide hole 101A projecting in the axial direction is formed in the central portion of the joint 101. A step 101B is formed in the middle part of the joint 101.

The diaphragm 102 is arranged to detect pressure of the fluid introduced through the pressure guide hole 101A and includes a diaphragm body 102A on which a strain gauge (not shown) is formed and a tubular portion 102B formed on a peripheral edge of the diaphragm body 102A.

In assembling the diaphragm 102, an opening end of the tubular portion 102B abuts on an end face of the joint 101 and welding is performed while keeping the joining state. A welded portion 103 is formed along a periphery of the diaphragm 102.

According to the Reference, since welding is performed with a predetermined jig located close to a joint portion between the joint 101 and the diaphragm 102, the vicinity of the outer peripheral portion of the welding portion needs to be a space for welding. Also, the welded portion 103 needs a sufficient clearance in height from the step 101B of the joint 101 for welding operation.

Therefore, a pressure sensor requires the space around the joint 101 for welding the diaphragm 102 to the joint 101, which limits the downsizing of a pressure sensor.

Further, both of the joint 101 and the diaphragm 102 are made of stainless steel, which restricts weight reduction of a pressure sensor and yet incurs cost increase.

SUMMARY OF THE INVENTION

An object of the present invention is to provide a pressure sensor enabling reduction in size and weight, and a manufacturing method of the same.

A pressure sensor according to an aspect of the present invention includes: a joint in which a pressure guide hole is formed; a diaphragm for detecting pressure of fluid introduced through the pressure guide hole; and an adapter disposed between the joint and the diaphragm, in which the adapter is provided with an axis portion including a communicating hole formed to intercommunicate the pressure guide hole and a pressure guide portion provided in the diaphragm, and a flange projecting in a radial direction of the axis portion, the axis portion being arranged so that one end thereof does not interfere with the joint and the other end thereof is welded firmly to the diaphragm, and the peripheral edge of the flange being caulked with the joint.

According to another aspect of the present invention, a method of manufacturing the pressure sensor includes the steps of: welding the diaphragm to the adapter; thereafter, arranging the welded portion between the diaphragm and the adapter to be positioned on the inner side of an end face of the joint; and caulking the flange of the adapter to which the diaphragm is welded with the joint.

In the above arrangement of the present invention, the diaphragm is welded to the adapter in a predetermined place, thereafter, the adapter is set in a predetermined location in the joint, and a predetermined part of the joint is pressed against an outer peripheral edge of the flange by a caulking jig, thereby caulking with the joint is performed.

According to the present invention, the diaphragm is not directly joined to the joint, but the diaphragm is first welded to the adapter, and thereafter the adapter is fixed to the joint by caulking. Therefore, the welding operation can be performed in a place away from a position of the joint. Furthermore, since the caulking operation of the joint to the adapter is performed by pressing a predetermined part formed in advance in the joint against the outer peripheral edge of the flange, a wide space is not required in the vicinity of the adapter for the caulking operation. As a result, since the wide space is not required in the vicinity of the diaphragm for manufacturing the pressure sensor, a wasteful space is eliminated, which enables size reduction of the pressure sensor. Moreover, since it is the joint that is caulked to the adapter, it is not necessary for the joint to be made of stainless. An inexpensive and light material can be employed for the joint, so that weight reduction as well as cost reduction of the pressure sensor itself can be achieved.

In addition, since the caulking of the joint is not directly performed to the diaphragm, the problem that stress is transmitted to the diaphragm in the caulking operation can be prevented.

According to the pressure sensor of the present invention, it is preferable that the axis portion is arranged so that one end of the axis portion is positioned away from the joint.

According to the arrangement of the present invention, even if a great force is transmitted from the adapter to the joint to move the axis portion close to the vicinity of the pressure guide hole in caulking operation, one end of the axis portion of the adapter does not interfere with the vicinity of the pressure guide hole. Therefore it can be so arranged that stress is not transmitted to the diaphragm.

Further, it is preferable that an O-ring is provided between the flange of the adapter and the joint.

According to the arrangement of the present invention, since a space between the flange and the joint is sealed by the O-ring, the fluid introduced in the pressure guide hole does not leak to a space on the diaphragm side of the joint through the space between the flange and the joint. Therefore, deterioration of a pressure sensor performance due to leak of the fluid can be prevented.

The flange is preferably constituted so that the ratio between the projecting dimension of the flange in a radial direction and the flange thickness is 1 or more in order that the stress applied to the diaphragm by the caulking is relieved According to the above arrangement of the present invention, since the projecting dimension of the flange in the radial direction can be made large relative to the dimension of the flange in the thickness direction, the caulking portion of the flange can be situated in an outer peripheral edge thereof rather than in the vicinity of the axis portion of the flange. Therefore, the stress transmission to the axis portion due to caulking is reduced and the problem that the stress is transmitted to the diaphragm through the adapter caused by the caulking operation can be eliminated.

DETAILED DESCRIPTION OF PREFERRED EMBODIMENTS

An embodiment of the present invention will be described below with reference to accompanying drawings.

Figure 1:
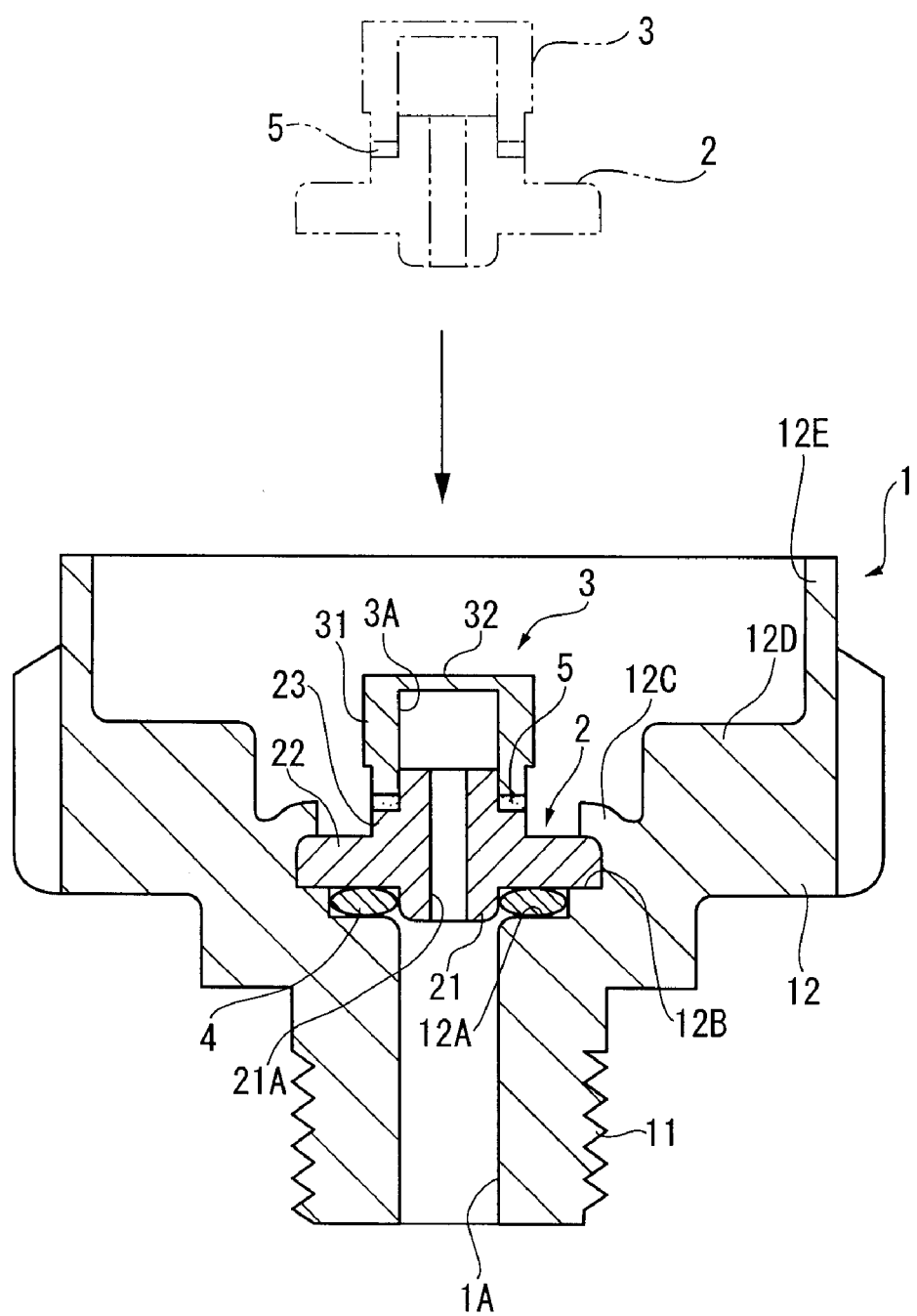
FIG. 1 is a cross section showing a pressure sensor in a preferred embodiment of the present invention.
Figure 2:
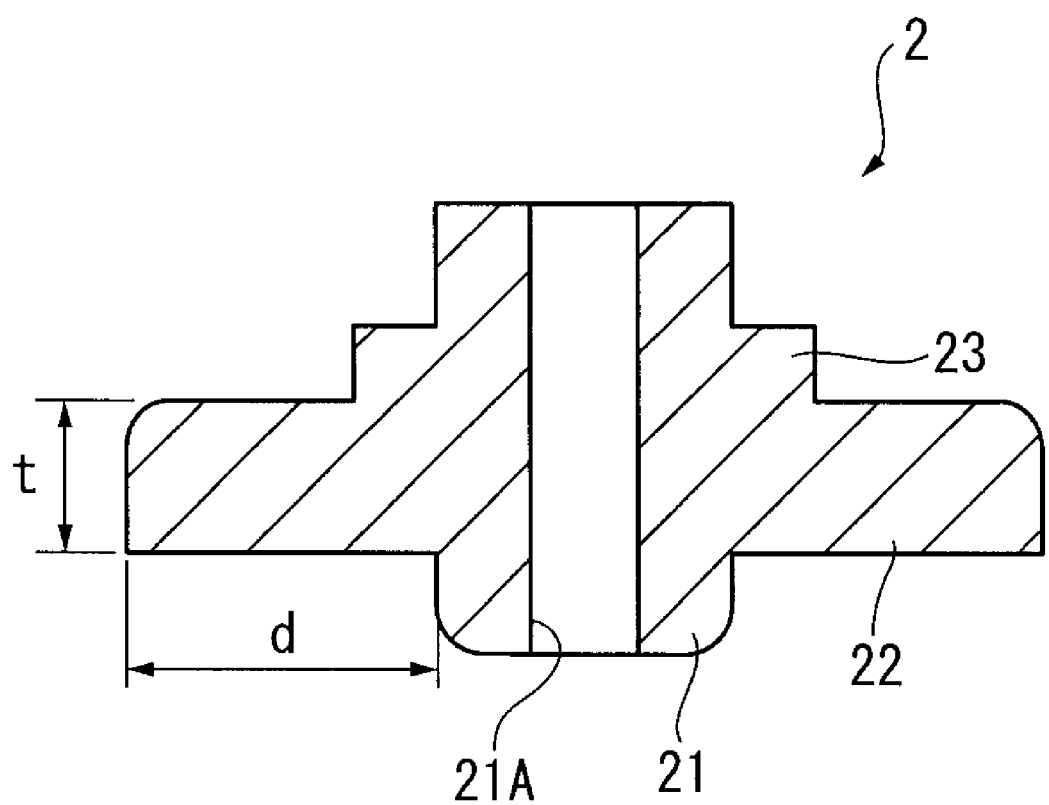
FIG. 2 is a cross section showing an adapter included in the pressure sensor.
Figure 3:
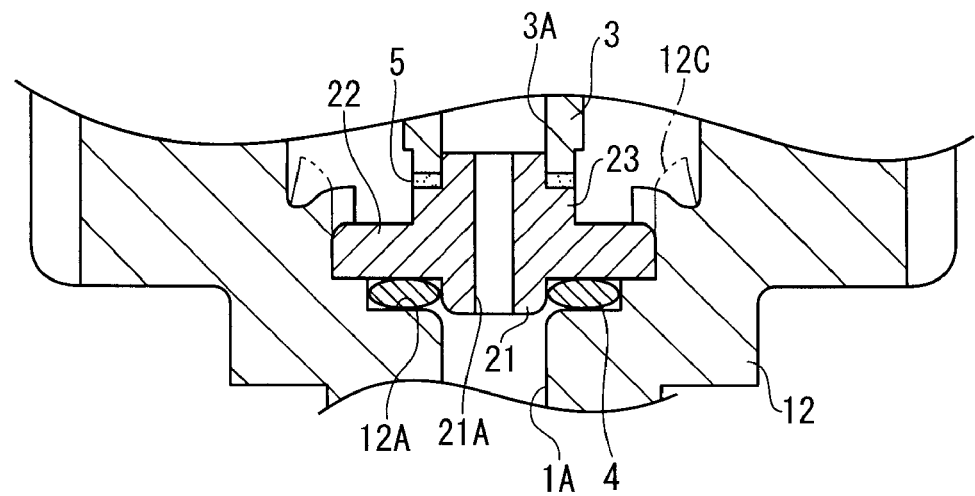
FIG. 3 is an enlarged cross section of a principal portion in FIG. 1.

FIGS. 1 to 3 show a pressure sensor in an embodiment of the present invention.

FIG. 1 is a cross section showing the pressure sensor. FIG. 2 is a cross section showing an adapter included in the pressure sensor. FIG. 3 is an enlarged cross section of a principal portion in FIG. 1.

In FIG. 1 showing the entire arrangement, the pressure sensor includes a joint 1 arranged to be attachable to a pipe (not shown) in which fluid to be measured flows, an adapter 2 disposed in the joint 1, a cylindrical diaphragm 3 with a bottom disposed in the adapter 2, and an O-ring 4 disposed between the adapter 2 and the joint 1.

The joint 1 includes a screw portion 11 disposed at one end thereof and screwed into the pipe (not shown), and a cup-shaped joint body 12 formed integrally with the screw portion 11, the joint 1 having a pressure guide hole 1A formed along the center axis.

The joint body 12 is provided with an O-ring-placing portion 12A having a substantially ringed shape formed in the vicinity of an opening end of the pressure guide hole 1A.

An adapter-placing portion 12B on which the adapter 2 is placed is formed on an outer peripheral portion of the O-ring-placing portion 12A, being in parallel with the O-ring-placing portion 12A. A caulking portion 12C is formed on an outer peripheral edge of the adapter placing portion 12B, the caulking portion being plastically deformable by caulking. The caulking portion 12C is formed in an upright state before caulking the adapter 2 (refer to an imaginary line in FIG. 3), whereby the adapter 2 does not interfere with the caulking portion 12C when the adapter 2 is placed on the adapter-placing portion 12B. An upright portion 12D is formed on an outer peripheral portion of the caulking portion 12C and an outer peripheral edge 12E is formed on an outer peripheral edge of the upright portion 12D.

Any kind of material is adaptable for the joint 1 as long as it is light in weight and strong enough in strength, but an aluminum alloy is preferable in terms of light weight, and a copper alloy is preferable in terms of strengthening of the screw portion 11.

FIG. 2 shows a detailed structure of the adapter 2.

Referring to FIGS. 1 and 2, the adapter 2 is provided with an axis portion 21 disposed concentrically with the joint 1, a flange 22 projecting in the radial direction at the nearly middle position of the axis portion 21, and a diaphragm-placing portion 23 on which the diaphragm 3 is placed, all of which are formed integrally and made of stainless steel.

The axis portion 21 is provided with a communicating hole 21A intercommunicating with the pressure guide hole 1A of the joint 1, and the communicating hole 21A is formed coaxially with the pressure guide hole 1A. One end of the axis portion 21 is positioned away from the O-ring-placing portion 12A by a predetermined dimension so that the one end does not interfere with the O-ring-placing portion 12A of the joint 1, and the other end is welded to the diaphragm 3.

One end face of the peripheral portion of the flange 22 is positioned on the adapter-placing portion 12B and the other end face of the peripheral portion is fixed by caulking to the caulking portion 12C of the joint 1.

In the flange 22, a ratio of a dimension d projecting in the radial direction to a dimension t of the thickness direction should be in a range of 1 to 3, more preferably in a range from 1.5 to 2.5. In the case that the ratio is less than 1, the caulking of the joint 1 causes a problem of stress transmission to the axis portion 21 because the caulking portion 12C comes excessively close to the axis portion 21. In the case that the ratio is more than 3, downsizing of pressure sensors can not be achieved successfully.

The diaphragm-placing portion 23 is fixed to an end face of the cylindrical diaphragm 3 by welding. In other words, a welding portion 5 is formed along a circumferential direction between the diaphragm 3 and the diaphragm-placing portion 23.

The diaphragm 3 is provided with a tubular portion 31 joined to the diaphragm-placing portion 23 at one end face and a disc-shaped body 32 made of stainless steel formed integrally with the tubular portion 31 at the other end face, and an inner space of the diaphragm 3 serves as a pressure guide portion 3A.

An inner diameter of the tubular portion 31 is equal to an outer diameter of the axis portion 21 of the adapter 2, and the pressure guide portion 3A is communicated with the pressure guide hole 1A through the communicating hole 21A.

A strain gauge (not shown) is provided on the outer end face of the disc-shaped body 32. Deformation of the body 32 corresponding to the fluid pressure guided to the pressure guide portion 3A from the pressure guide hole 1A is recognized by the strain gauge and a pressure value is detected.

The O-ring 4 is interposed between the O-ring-placing portion 12A of the joint 1 and the flange 22 of the adapter 2. The cross section of the O-ring is circular shape. The O-ring 4 is so arranged that an end of the axis portion 21 is inserted into the O-ring 4.

Note that the O-ring 4 may have any cross sectional shape as long as the O-ring 4 seals a space between the O-ring-placing portion 12A of the joint 1 and the flange 22 of the adapter 2, and, for example, an ellipse, a quadrangle, or the like may be employed.

Next, a manufacturing method of the pressure sensor in the present embodiment will be described.

First, the joint 1, the adapter 2 and the diaphragm 3 are formed in advance in predetermined shapes and then the adapter 2 and the diaphragm 3 are joined and the joining portion is welded.

Thereafter, the O-ring 4 is placed on the O-ring-placing portion 12A of the joint 1 and further, the flange 22 of the adapter 2 is placed on the adapter-placing portion 12B of the joint 1.

In this state, the welding portion 5 of the diaphragm 3 with the adapter 2 is positioned inside the joint 1. Then, the caulking portion 12C of the joint 1 is pressed on the flange 22 of the adapter 2 for caulking by using a caulking jig or the like (not shown) to fix the flange 22 of the adapter 2 to the joint 1.

The following advantages can be obtained according to the above embodiment.

(1) In a pressure sensor according to the present embodiment, the adapter 2 disposed between the joint 1 and the diaphragm 3 is arranged to have the axis portion 21 and the flange 22 projecting in the radial direction of the axis portion 21, in which the axis portion 21 is located so that one end thereof does not interfere with the joint 1 and the other end thereof is welded to be fixed to the diaphragm 3, and the peripheral edge of the flange 22 is caulked by the joint 1. Due to the arrangement described above, the diaphragm 3 is not directly joined to the joint 1, therefore welding operation can be performed in a widely spaced place where equipment is suitably arranged rather than in the vicinity of the joint 1. In addition, caulking operation does not require a wide space because caulking operation of the joint 1 to the adapter 2 is performed by pressing the caulking portion 12C formed in advance in the joint 1 against the outer peripheral edge of the flange 22. Moreover, since the welding is not required to be performed in the vicinity of the joint 1, the position of the welded portion 5 can be lowered. Accordingly, a wide space is not required in the vicinity of the diaphragm 3 for manufacturing the pressure sensor, hence a wasteful space can be eliminated, enabling size reduction of the pressure sensor. Also, fixing method of the adapter 2 to the joint 1 employs caulking instead of welding, which allows to use inexpensive and light materials such as aluminum alloy, copper alloy or the like for the joints, rather than stainless steel, enabling reduction in weight and cost of the pressure sensor itself.

Further, even if large stress is incurred and transmitted to the axis portion 21 via the flange 22 in caulking operation and as a result the axis portion 21 is elastically deformed, there is not such possibility that the axis portion 21 collides with the joint 1 to transmit the stress to the diaphragm 3 since the axis portion 21 of the adapter 2 is so arranged that one end thereof does not interfere with the joint 1. Therefore, high accuracy and long term stability for the pressure sensor can be secured. To the contrary, in the case that the caulking operation is performed in a state that the axis portion 21 of the adapter 2 is contacted with the joint 1, the axis portion 21 is elastically deformed to interfere with the joint 1, whereby the stress may be transmitted to the diaphragm 3.

(2) The axis portion 21 of the adapter 2 is arranged so that one end thereof is positioned away from the joint 1. Therefore, even if a great force is transmitted from the adapter 2 to the joint 1 in caulking operation, and the axis portion 21 is elastically deformed and comes close to the pressure guide hole 1A, the one end of the axis portion 21 of the adapter 2 is inserted into the pressure guide hole 1A of the joint 1 and does not interfere with the joint 1. Accordingly, high accuracy and long term stability of the pressure sensor can be secured.

(3) The O-ring 4 provided between the flange 22 of the adapter 2 and the joint 1 seals the space between the flange 22 and the joint 1, therefore the fluid introduced in the pressure guide hole 1A does not leak to the inner space of the joint 1 through the space between the flange 22 and the joint 1. Consequently, deterioration of performance of the pressure sensor due to leakage of the fluid can be prevented.

(4) Since the ratio of a projecting dimension of the flange 22 in a radial direction to a dimension of the flange 22 in thickness direction is arranged to be 1 or more, the caulking portion of the flange 22 can be positioned on the outer peripheral edge rather than in the vicinity of the axis portion 21 of the flange 22. Therefore, occasions of caulking stress transmission to the axis portion 21 is reduced, which results in eliminating such problem that the stress is transmitted to the diaphragm 3 through the adapter 2 in caulking operation. Therefore, high accuracy and long term stability of the pressure sensor can be secured.

(5) Since the adapter-placing portion 12B is provided in the joint 1 for placing the flange 22 of the adapter 2, positioning the adapter 2 relative to the joint 1 can be securely performed, and thus the caulking operation can be easily performed.

Note that the present invention is described with reference to the preferred embodiment, but the present invention is not limited to the above embodiment, and modifications within the scope where an object of the present invention can be achieved are included in the present invention.

Figure 4:
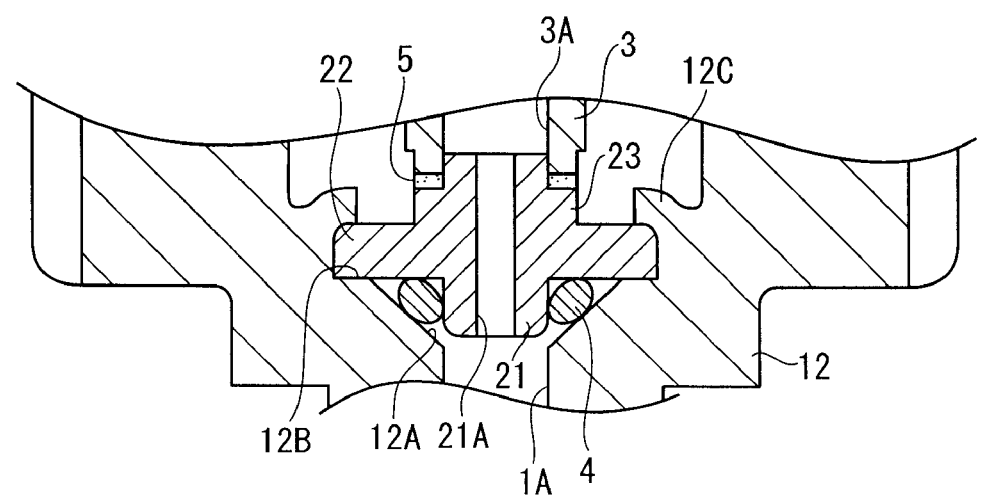
FIG. 4 is a view showing a modification example of the present invention, corresponding to FIG. 3.
Figure 5:
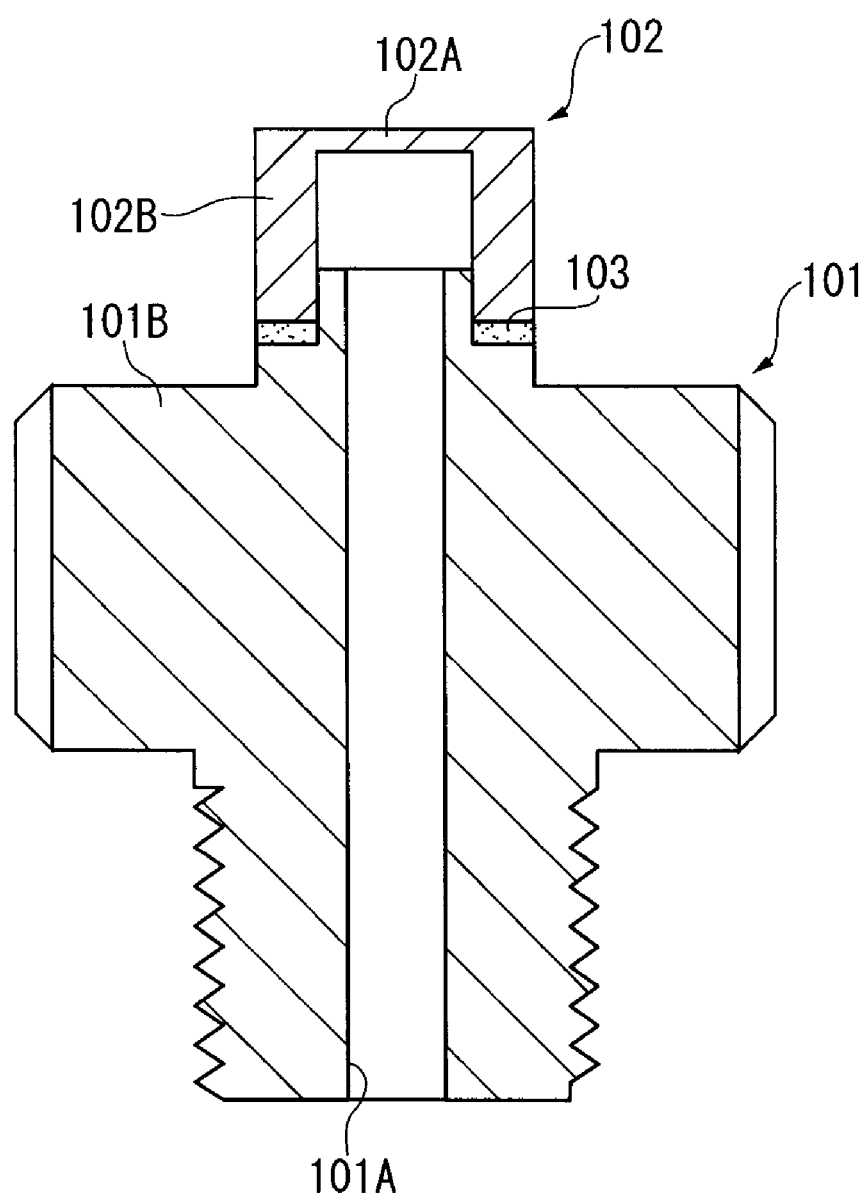
FIG. 5 is a cross section showing a related art.

For example, according to the above embodiment, the O-ring-placing portion 12A of the joint 1 is formed in parallel to the adapter-placing portion 12B, but in the present invention, the O-ring-placing portion 12A of the joint 1 may be tapered relative to the pressure guide hole 1A as shown in FIG. 4.

Further, in the preferred embodiment, the flange 22 is formed substantially at the middle portion of the axis portion 21 and the axis portion 21 is projected from the flange 22, but in the present invention, the flange 22 may be formed from one end face of the axis portion 21 to the middle portion, so that one end face of the adapter 2 may have a shape without any steps.

The priority application Number JP2004-096050 upon which this patent application is based is hereby incorporated by reference.

What is claimed is:

1. A method of manufacturing a pressure sensor comprising the steps of:

providing a pressure sensor, the pressure sensor including a joint having a pressure guide hole, a diaphragm to detect a pressure of fluid introduced from the pressure guide hole, and an adapter disposed between the joint and the diaphragm, wherein the adapter includes an axis portion, a flange projecting in a radial direction from the axis portion, and a communicating hole, wherein the joint includes an O-ring placing section having a substantially ringed shape extending from an opening end of the pressure guide hole toward an outer periphery thereof, a wall rising from the outer periphery of the O-ring placing section, an adapter placing section extending from an end of the wall to be provided at a level different from the O-ring placing section for mounting the adapter and a plastically deformable caulking portion provided on an outer periphery of the adapter placing section, an O-ring being provided between the O-ring placing section and the flange, the O-ring receiving a first end of the axis portion therein, wherein the axis portion is disposed such that the first end is spaced apart from the O-ring placing section and a second end is welded to the diaphragm, wherein the communicating hole is formed to communicate between the pressure guide hole and a pressure guide portion formed in the diaphragm;

welding the diaphragm to the adapter;

mounting the O-ring on the O-ring placing section of the joint and mounting the flange of the adapter on the adapter-placing section of the joint to arrange the welded portion between the diaphragm and the adapter such that the welded portion is positioned on an inner side of an end face of the joint; and caulking the joint to a peripheral edge of the flange of the adapter so that the axis portion does not collide with the joint.

* * * * *